July 22, 1941.   P. L. VANNUCCI   2,250,427
CAN ALIGNER
Filed Aug. 28, 1939
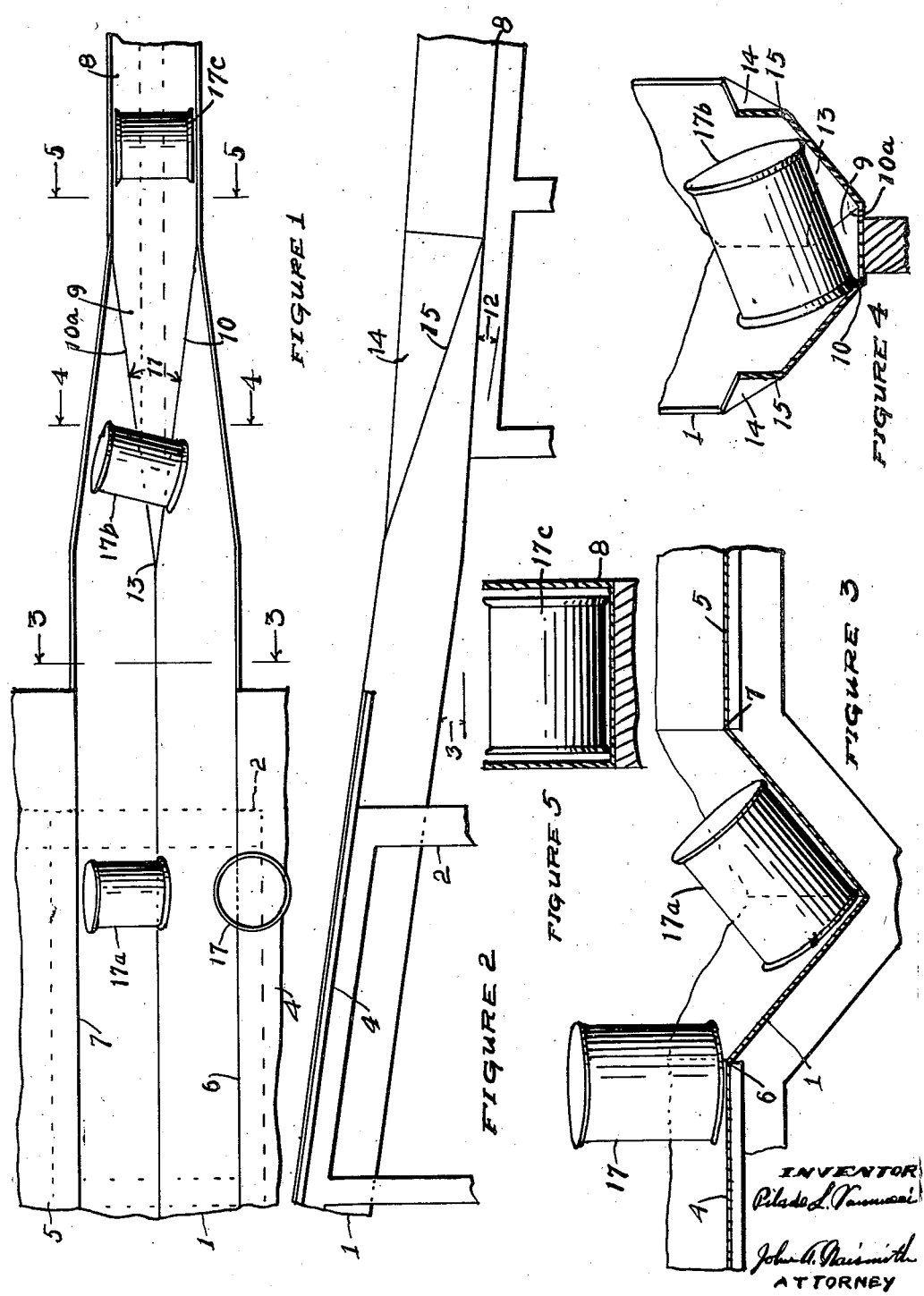

Patented July 22, 1941

2,250,427

UNITED STATES PATENT OFFICE 2,250,427

CAN ALIGNER

Pilade L. Vannucci, San Jose, Calif.

Application August 28, 1939, Serial No. 292,324

1 Claim. (Cl. 193—43)

The present invention relates particularly to a device constructed and arranged to receive a group of cans and automatically reposition them for delivery in a single row.

In illustrating the operation and use of the device specific reference is made to the canning art.

One step in the art mentioned is the labeling of the cans, but to effect the said labeling the cans must be delivered to the labeling machine in a continuous row. Heretofore it has been customary for two operators, working alternately, to remove the cans from the stacks by hand and place them in a row in the chute leading to the labeling machine.

However, since various can handling devices have now been developed it is highly desirable that means be provided whereby single cans or cans in groups of any size or form may be automatically positioned in a single row in a feed chute when released thereto, and without manual adjustment.

It is, therefore, the principal object of my invention to provide means for receiving a group of cans and automatically aligning them in a single row ready for delivery to any desired point.

It is another object of the invention to provide means of the character indicated that will be simple in form and construction, economical to manufacture, simple in operation, durable, and highly efficient in its practical application.

In the drawing:

Figure 1 is a top plan view of a device embodying my invention, parts being broken away.

Figure 2 is a side elevational view of the structure as shown in Figure 1.

Figure 3 is an enlarged sectional view on line 3—3 of Figure 1.

Figure 4 is an enlarged sectional view on line 4—4 of Figure 1.

Figure 5 is an enlarged sectional view on line 5—5 of Figure 1.

Referring now more particularly to the drawing, I show at 1 a V shaped chute mounted upon any suitable type of support as at 2, and so inclined with reference to a horizontal plane, as at 3, that cylindrical objects deposited therein as hereinafter described will readily roll down the same.

In the present instance a can receiving platform is mounted on either side of the chute as shown at 4 and 5, each platform having one edge aligning with the adjacent upper edge of the chute as at 6 and 7.

At 8 is provided a chute that is rectangular in transverse cross-section, and is jointed to and communicates with the V shaped chute in the following manner to provide a continuous runway for cans.

Since the cans will lie angularly in the V shaped chute portion and horizontally in the chute portion 8, the chute portion 8 can be made just wide enough to permit the cans to roll freely therein.

In joining the two chute portions the flat bottom of the chute portion 8 is formed into a projecting V shaped part 9 at one end and this is fitted into a complementary notch in chute portion 1, the lines of juncture being indicated at 10 and 10a, and the notch being indicated by the reference character 11.

Since the sides of the chute portion 1 are angularly disposed relative to each other it follows that part 9, when fitted as described, assumes an angular position relative to the bottom of chute 1 as indicated at 12. The lines of juncture 10—10a, therefore, are inclined forwardly at the same angle as the bottom of chute 8 and diverge forwardly from a common point 13 lying in the exact center of chute 1 to the two sides of chute 8.

The sides of chute 8 flare outwardly from the base of projection 9, and are triangular in shape as shown at 14. This is due to the sloping sides of the chute portion 1, one line of juncture being shown at 15.

The result of this arrangement is that when a can is placed in the chute 1 it will roll down the same until it reaches the point 13 where, due to the weight of the can, its bottom edge will follow along the joint 10 or 10a opposite to the side of chute 1 against which it leans. By the time the can has reached the end of this joint it will have assumed a horizontal position on the bottom of chute 8, along which it will roll.

When a can is deposited in the chute from a platform as 4 the action is similar. In this case the can 17 is stood upright on the platform and then pushed over the edge. Sliding down the adjacent side of the chute 1 it contacts the opposite side as shown at 17a. The angle between the two sides being greater than a right angle, the can will roll easily down the inclined chute until its bottom edge contacts the edge of part 9 which it will follow as at 17b. The final position of the can as it enters chute portion 8 is shown at 17c.

By means of the construction shown any number of cans may be placed on a platform at one time, either by hand or by machine, and these may be fed into the chute 1 by pushing them in a row or more at a time, and if more than a single row is pushed in at one time the uppermost cans will readily work down into alignment with the bottom cans.

When two platforms as 4 and 5 are used, then a group of cans may be pushed in alternately from the two sides of the chute, so that an almost unbroken row of cans may be discharged down chute 8.

Although a certain specific embodiment of the invention has been illustrated and described, it will be understood that various alterations in the details of construction and mode of assembly and operation may be made without departing from the scope of the invention as indicated in the appended claim.

I claim:

An aligner for cylindrical cans or the like, comprising in combination, an inclined trough portion composed of upwardly diverging walls arranged in substantially V-shaped relation to each other, the angle of divergence of said walls being constant throughout the length of said portion, said portion being adapted to rollably transport a can on an inclined axis, a second inclined trough portion having vertical side walls connected by a flat bottom and adapted to rollably transport a can on a horizontal axis, and a connecting trough portion having at its upper end upwardly diverging walls arranged in substantially V-shaped relation to each other and having the same angle of divergence as said walls of said first portion to coincide therewith, said connecting trough portion having at its lower end a flat bottom and vertical side walls coinciding with said bottom and walls of said second portion, said bottom and walls of said connecting trough portion narrowing to points at the upper end of said connecting portion, and said diverging walls maintaining the same angle of divergence throughout their length and narrowing to points at the lower end of said portion, whereby to progressively bring the can to a horizontal axis as it passes through said connecting portion.

PILADE L. VANNUCCI.